INVENTOR
ANTONIO FERRENTINO
BY Ward, Haselton, McElhannon,
Brooks & Fitzpatrick
ATTORNEYS.

Oct. 21, 1969          A. FERRENTINO          3,473,340
METHOD AND APPARATUS FOR BRINGING ASHORE THE LAND ENDS OF A
PLURALITY OF SUBMARINE CABLES
Filed Feb. 29, 1968                           4 Sheets-Sheet 2

INVENTOR
ANTONIO FERRENTINO
BY Ward, Haselton, McElhannon,
   Brooks & Fitzpatrick
            ATTORNEYS.

Oct. 21, 1969 A. FERRENTINO 3,473,340
METHOD AND APPARATUS FOR BRINGING ASHORE THE LAND ENDS OF A
PLURALITY OF SUBMARINE CABLES
Filed Feb. 29, 1968 4 Sheets-Sheet 3

INVENTOR
ANTONIO FERRENTINO
BY Ward, Haselton, McElhannon,
Brooks & Fitzpatrick
ATTORNEYS.

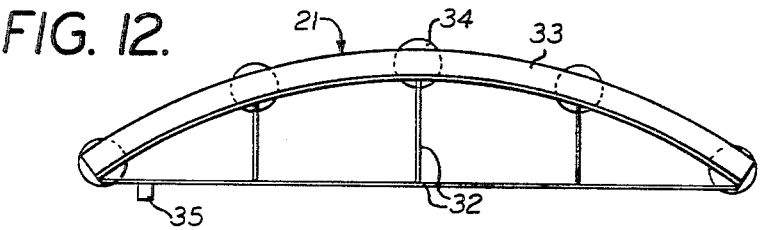
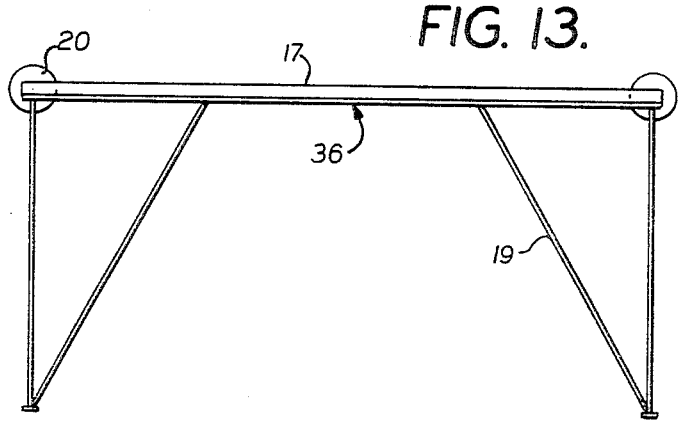
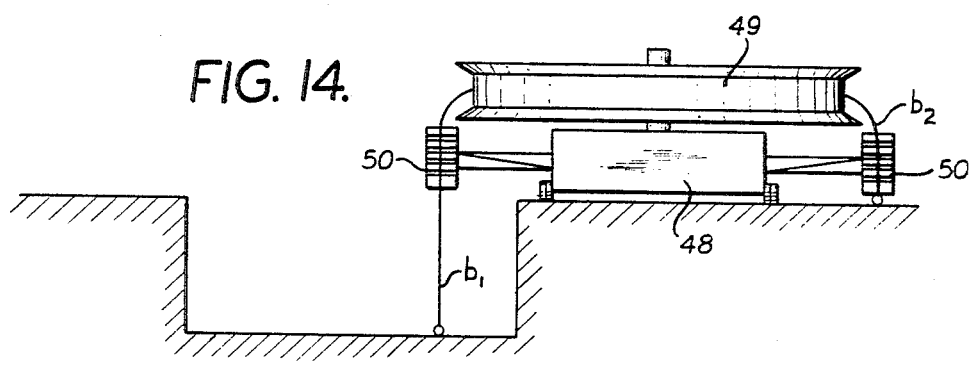
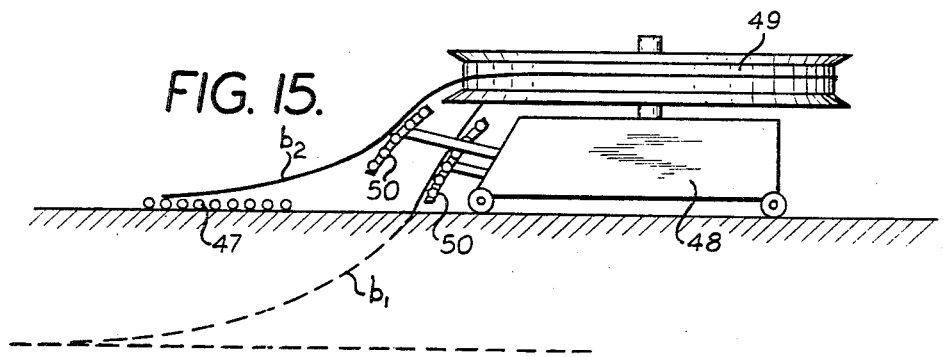

United States Patent Office 3,473,340
Patented Oct. 21, 1969

3,473,340
METHOD AND APPARATUS FOR BRINGING ASHORE THE LAND ENDS OF A PLURALITY OF SUBMARINE CABLES
Antonio Ferrentino, Naples, Italy, assignor to Pirelli S.p.A., Milan, Italy, a corporation of Italy
Filed Feb. 29, 1968, Ser. No. 709,483
Claims priority, application Italy, Mar. 13, 1967, 13,639/67
Int. Cl. B63b *35/06;* F16l *1/00*
U.S. Cl. 61—72.1
13 Claims

ABSTRACT OF THE DISCLOSURE

The vessel carrying the plural reels of cable is brought to one side of the desired cable laying path alongside a temporary wharf. A bight is formed in each cable and placed on a pulley mounted on a wheeled vehicle. The vehicle is moved from ship to shore on the wharf or on an auxiliary floating platform and then propelled alongside a trench, the cable by this action being withdrawn from the reel and laid over the land. Special supports and guides are provided for leading the cable out of the hatch, across the deck and over the end of the vessel.

DISCLOSURE

The present invention relates to a method and apparatus for bringing ashore the land ends of a plurality of submarine electric cables which have been laid simultaneously through a body of water by paying them out over the side of a vessel. In particular the process is intended for landing the shore ends where such ends have substantial length.

The bringing ashore of the land ends of submarine cables is without doubt the most delicate operation involved in the process of laying such cables. There are several reasons for this of which the most significant is the impossibility of bringing the vessel up to the shore line because of its draft. Therefore, to carry out said operation, resort is had to special ancillary floating means of shallow draft able to draw the cable, for instance, by making it pass in the groove of a pulley with which they are provided, as far as the shore.

If short stretches of water, as for instance, lakes and rivers, are to be crossed, small sized floating means can be used carrying a single reel able to support a cable of sufficient length to reach completely across. Such floating means, on account of its shallow draft, can reach the shore line, permitting the cable end to be brought ashore. This method, however, cannot be used when several cables, as for instance, for a plural phase system, are to be laid simultaneously. In such case, even for short stretches of water, it is necessary to use larger floating means in order to carry all of the individual supply reels for each of the cables. Because of the number of cables, they are laid by sliding overboard on appropriate chutes disposed along the side of the floating means while the latter is towed, for example, by means of a tug or by suitable means situated ashore.

A floating means of the last mentioned type may have on landing a sufficiently shallow draft if it is almost completely unloaded that it can reach the shore line; however, if the cables are to continue for a considerable distance ashore, as for instance, on dry river banks, the floating means will still have a substantial load and appreciable draft preventing it from getting close to shore. Resort cannot be had to an ancillary floating means of the type mentioned above, since the laying operation must be continued ashore.

An already known method for landing the shore ends under the foregoing circumstances when the water crossing is over involves paying off each cable from its reel and collecting it in hanks of figure eight shape on the deck of the floating means until the end of the cable is reached. The cable is then dragged ashore by its end by means of known devices. The collection of the cables in hanks is effected by hand and this operation requires the utmost accuracy in order not to impart to the cables bending strains greater than the maximum permissible.

The figure eight method cannot be used when the cables have a large cross section and an increased minimum bending radius. For instance, with a minimum bending radius of 3 meters, which is typical for high-voltage oil-filled cables, it is no longer possible to collect the cables in hanks manually and, even if this were feasible, the room on the deck of the floating means would not be sufficient to receive them. Another drawback of the figure eight method is that it involves a certain risk of damaging the cable both during the collection and the uncoiling of the hanks, and druing the drawing operation to bring the cables ashore.

The present invention aims at providing a method for landing long shore ends of electric cables of plural phase systems simultaneously laid through stretches of water, which is devoid of the above indicated drawbacks and neither requires the use of large-size, expensive and complicated devices nor the employment of skilled operators.

An object of the present invention is to provide a method for bringing ashore the land ends of a plurality of submarine electric cables which have been laid simultaneously through a body of water by paying them out over the side of a vessel through individual chutes and from respective supply reels in the holds thereof. Said method in accordance with the invention comprises the steps of maneuvering the vessel as it nears the shore off to one side of the desired cable path and bringing one end of the vessel opposite a landing point off to the same side of the desired path with the remainder of the vessel further from the desired path, removing one of the cables from its chute and laying it along the deck of the vessel from its reel to said one end of the vessel by both raising a portion of the cable adjacent the vessel and withdrawing cable from the reel, continuing to draw cable from the reel paying it out over said end of the vessel to form a bight, drawing the bight ashore and toward a desired terminus all the while withdrawing cable from the reel until the remaining cable is laid ashore, and repeating the operation for each of the other cables.

To prevent the cable which has been laid through the water from being subjected during the aforesaid maneuvering of the vessel to sudden stresses or substantial slack, it is necessary for the departure from the desired cable path to take place gradually. An execution in accordance with the present invention involves the steps of first leaving the desired cable path and heading the vessel toward said landing point, and then further altering the course of the vessel to bring said end opposite the landing point, said landing point being substantially in line with the main underwater section of the cable which is furthest removed from the desired cable path on either side thereof.

The raising of the cable from the water adjacent the vessel and its disposition on the deck of the vessel are preferably carried out according to the following steps: providing a first rope between the end of the vessel and a submerged point of the cable where the rope is attached to the cable, providing a second rope between the vessel and a point on the cable nearer to the vessel than the first point where the second rope is attached to the cable, and manually manipulating the two ropes to lift the cable from the chute and lay it along the deck.

To facilitate the final laying of the shore end into a trench, the cable portion intended to become submerged, which extends from the vessel to the shore, is suitably sustained on the water level. In this manner the application of appropriate mechanical protecting elements to said cable portion is facilitated.

A further object of the present invention is to provide apparatus for bringing ashore the land ends of a plurality of submarine electric cables according to the above described process. In accordance with the invention such apparatus comprises a vessel having holds for receiving reels of cable; a hatch in the deck of the vessel for each reel; supported above each hatch a hatch sector and an orientable sector, each provided with rollers, for guiding the cable as it leaves the reel and directing it as it leaves the hatch, respectively; a plurality of trestle supported horizontal deck units provided with rollers for supporting and guiding the cable from the orientable sector to an end of the vessel; a swinging sector provided with rollers and mounted at said end of the vessel for guiding the cable overboard in any direction throughout an arc of 160° centered about a point at said end of the vessel; a floating platform; a wheeled vehicle capable of being supported on said platform and of being moved ashore therefrom, a pulley carried by said vehicle; and means for towing said platform from said vessel to an adjacent shore and for moving said vehicle from said platform to the shore.

In a preferred embodiment of the apparatus, the hatch sector comprises a pair of planar frames of curved profile joined in spaced apart relation by a plurality of U-shaped members, its rollers being mounted in said members along a curved path established in accordance with the permissible bending radius of the cable, said hatch sector being hinged at both its ends to a supporting trestle, directly at its upper end and through a tie rod at its lower end; said orientable sector comprises a pair of planar frames in the shape of circular segments joined in spaced apart relation by a plurality of transverse members, the curved portion of each of said segments being formed from an arcuate beam to which the rollers of the orientable sector are secured; said deck units each comprising a pair of rails to which its rollers are secured; said swinging sector comprises a pair of planar frames having a straight portion and a curved portion, said last mentioned frames being joined in spaced apart relation by a plurality of U-shaped members to which its rollers are secured, said last mentioned rollers being disposed along a straight line in the straight portion of the frames and along a curved path in the curved portion of the frames, the curved path being established in accordance with said minimum bending radius of the cable, said swinging sector being hinged in a supporting trestle at two points for pivotal movement about a rectilinear axis passing through said two points; and said orientable sector is disposed in series with said hatch sector such that its rollers can be positioned horizontally for guiding cable to the side of the vessel or vertically for guiding cable to a deck unit.

If the vessel has a considerable draft it is advisable to provide two platforms, one for bringing the wheeled vehicle toward shore and the other acting as a wharf for landing the vehicle. If the vessel has a reduced draft, a single platform acting as a wharf will be sufficient.

The wheeled vehicle can carry the pulley either with its axis of rotation horizontal or with its axis of rotation vertical. In the first case the revolving shaft lies on appropriate supports, at least one of which can be lowered to allow the insertion of the cable bight or loop in the groove of the pulley. In the second case the wheeled vehicle supports the pulley on a single central shaft and is provided at its sides with two chutes provided with rollers, one for guiding the cable directly into the adjacent trench, and the other for guiding the cable into the groove of the pulley.

The means for towing the platform from the vessel to shore and for moving the wheeled vehicle from the platform to the shore can advantageously comprise an appropriate winch installed on the shore.

The invention will be better understood after reading the following detailed description of the presently preferred execution thereof with reference to the attached drawings in which.

Figure 9:
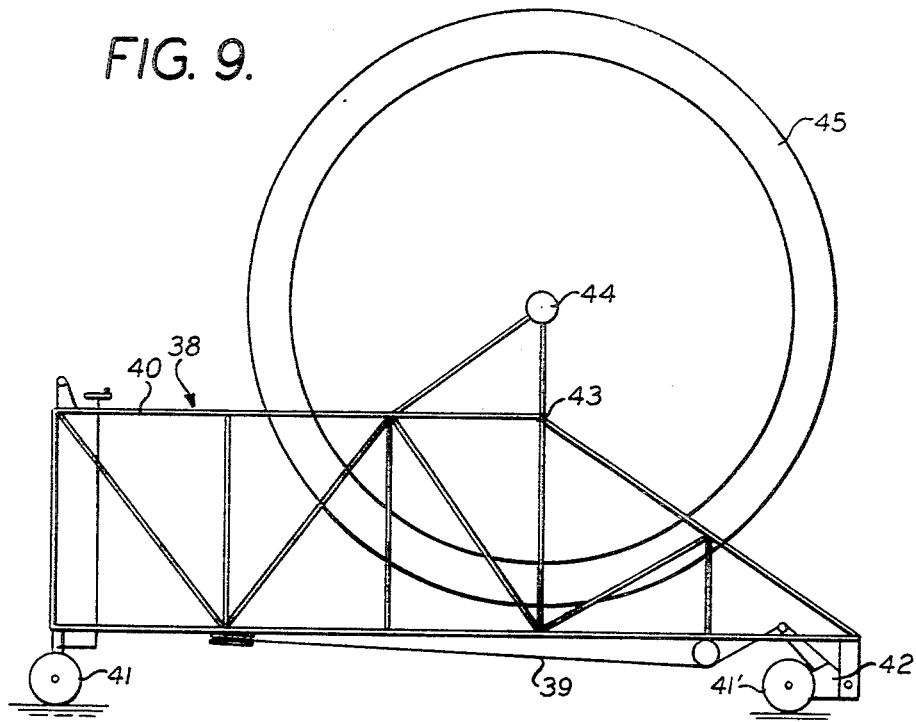
FIGURE 9 is a diagrammatic illustration of the wheeled vehicle with pulley used in the performance of the method outlined with reference to FIGURES 1 to 8.
Figure 10:
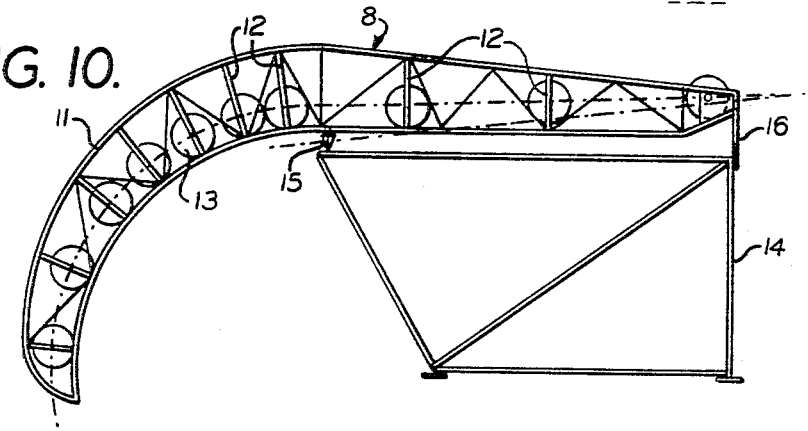

FIGURES 10, 11, 12, and 13, are views similar to FIGURE 9, respectively, of the swinging sector, the hatch sector, the orientable sector, and the deck unit; and FIGURES 14 anad 15 show another embodiment of the vehicle of FIGURE 9.

Throughout the several figures the same reference characters are used to designate the same or similar part. Reference should now be had to the drawings.

Figure 1:
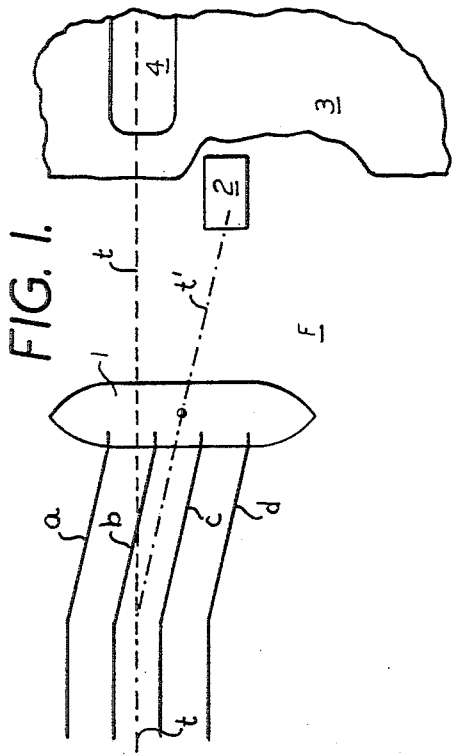
FIGURES 1 and 2 represent diagrammatically in top view the vessel approaching the shore for laying the four cables of a three-phase cable system under conditions permitting the vessel to come close to shore.

In FIGURE 1, the reference letters $a$, $b$, $c$, $d$, indicate the four cables for a three-phase system. The letter $t$ designates the desired or ideal cable path. The cables are laid by means of the vessel 1 through a body of water, in this particular case a river indicated generically with F. The reference numeral 2 represents a wharf which is the landing point and 3 is the shore, which extends for a certain width as far as the bank (not shown in the figure). A trench 4, appropriately created on the shore, will permit the shore ends of the cables to be placed underground.

The landing point 2 is at a certain distance from the line of the trench 4 in order to permit first the laying of all cables alongside the trench before their introduction into it. In the described embodiment, the landing point or wharf 2 is constituted by a floating platform. During the initial phases of the operation for bringing the land ends ashore according to the process of the present invention, the vessel must approach the shore preferably with that one of its ends, indicated with P in the figure, which was initially disposed on the opposite side of the path $t$ from the point 2.

Figure 2:
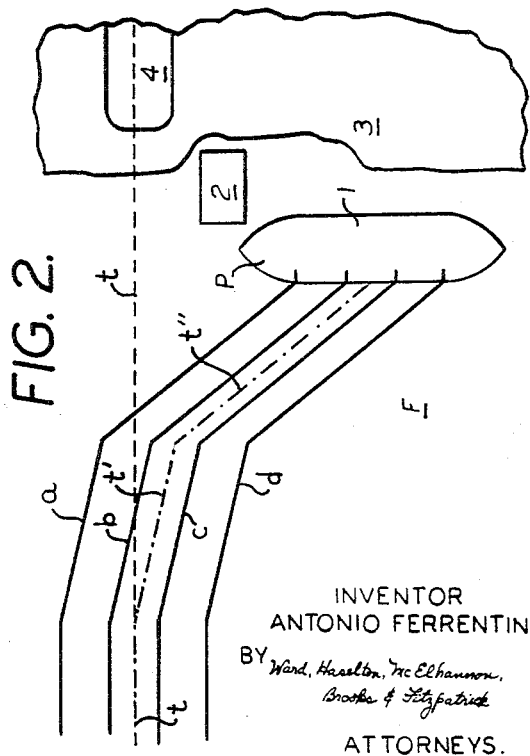
Figure 7:
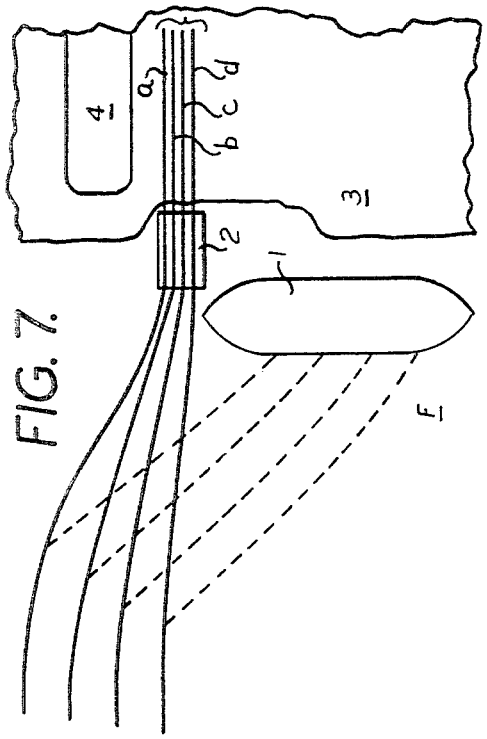
FIGURES 7 and 8 illustrate the final laying steps, in which the cables are laid into trenches.
Figure 8:
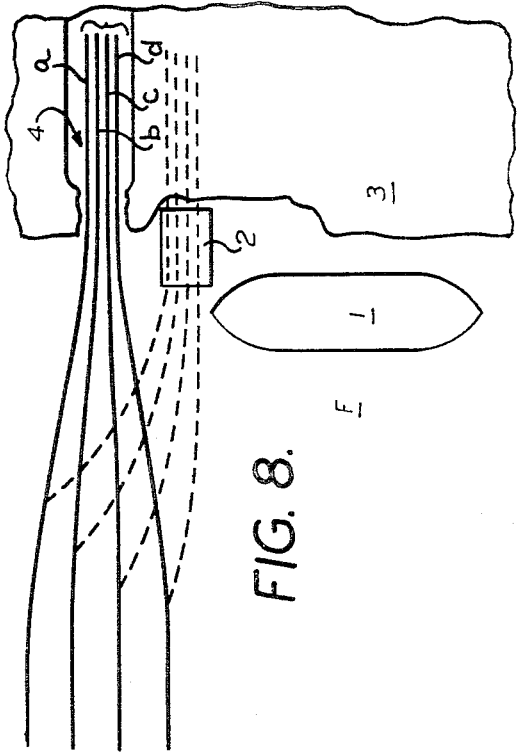

FIGURE 2 represents the case in which, the draft of the vessel being shallow, the end P of the vessel may be brought close to the platform 2. To carry out this approach, the route of the vessel must be altered from the ideal cable path or laying line $t$. In order not to impart sharp bends to the portions of the cables already laid and not to create a considerable slack, the alteration in course is carried out progressively, changing the route at first towards the platform 2, along line $t'$, and then, at a distance of about 20 meters from the platform, making a second change in order to bring the P of the vessel to said platform. During these maneuvers, the vessel is towed from land by means of a winch, not represented in the figures.

Figure 3:
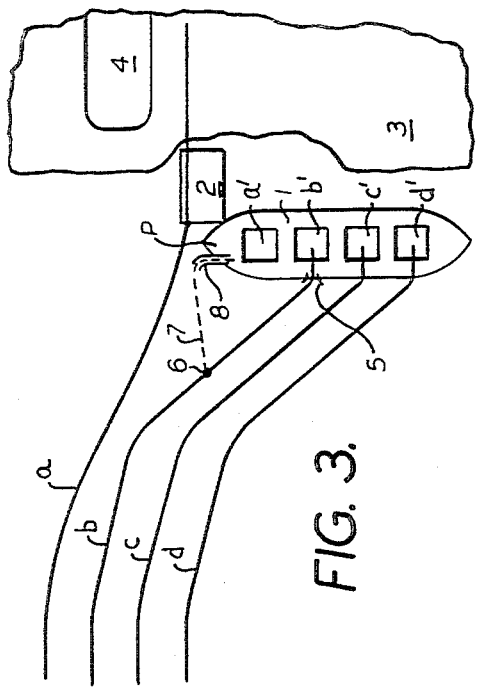
FIGURES 3 and 4 represent diagrammatically in top view the raising of a cable from the water and its placement aboard the vessel of FIGURES 1 and 2.
Figure 4:
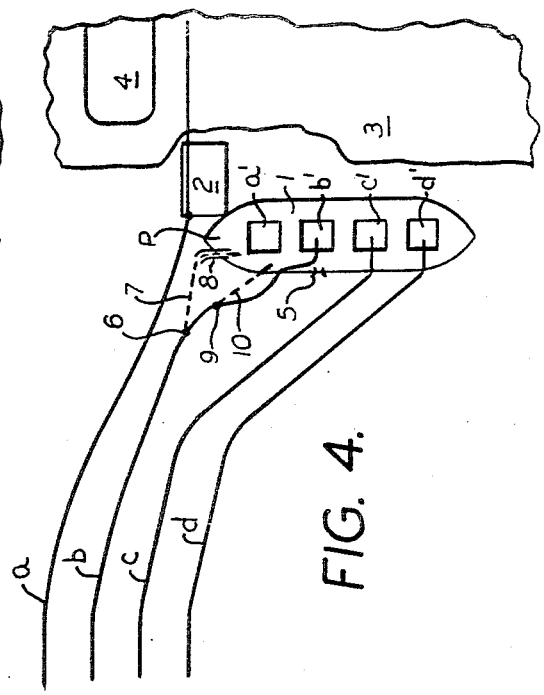

After the vessel has reached the shore each cable is raised from the water adjacent the vessel and laid on the ground. FIGURES 3 and 4 illustrate the steps for raising the cable $b$, cable $a$ having already been laid on the ground.

The reference letters $a'$, $b'$, $c'$, $d'$ indicate the hatches of the holds containing the supply reels. Each hatch is provided with a sector provided with rollers, called a hatch sector, for guiding the cable and supporting same as it leaves the hold. The hatches are also provided with a sector, also provided with rollers, which can be oriented in series with the hatch sector, to guide the cable to the corresponding laying chute.

For the sake of simplicity, FIGURES 3 and 4 illustrate only the chute associated with hatch $b'$ and desiganted by the numeral 5. The two above-mentioned sectors, whose function will be better explained below, have not been illustrated for greater clearness.

The cable $b$ is tied at a point 6, at a suitable distance from the vessel, by means of a rope 7, which is paid out through the swinging sector, diagrammatically represented in the figure and indicated with the reference numeral 8. In this manner the cable is firmly anchored. Another piont 9 of the cable, nearer to the vessel than the preceding one, is tied with a second rope 10. By acting on the latter rope it is possible to slacken the portion of the cable between point 9 and the supply reel and to remove it easily from the chute 5. By effecting a continuous pulling action by means of the rope 10, and, if needed, by means of other ropes secured to the cable at intermediate points, the portion of the cable adjacent the vessel can be raised on board. At the same time, by acting on the rope 7, the cable is brought up to the swinging sector 8. Upon completion of this phase of the operation the cable will extend from the hold containing the supply reel to the water along the deck of the vessel and the swinging sector 8. Now the rope 7 can be recoverced, but before doing this it is necessary to anchor the cable in a suitable way, for instance eby securing it to the platform 2.

The cable portion raised on board is disposed on appropriate deck units which connect the holds to the swinging sector 8. The latter is illustrated in detail in FIGURE 10 and is improved of two planar frames 11, having a straight portion and a curved portion, and joined in spaced apart relation by a plurality of U-shaped ties or members 12 to the arms of which they are connected. The ties 12 carry the rollers 13 which, in the straight portion of the frame, are disposed in a straight line and in the curved portion, along a path the curvature of which is less (greater radius) than the minimum permissible bending radius of the cable.

As shown, the swinging sector 8 is mounted on an appropriate trestle 14 which is situated at end P of the vessel. The mounting of sector 8 on trestle 14 is accomplished by means of two hinges 15, 16, which allow the sector to rotate about the axis shown by the broken line passing through them in FIGURE 10. The curved portion of the sector 8 projects from end P of the vessel and can be oriented, by rotating the sector about the axis passing through the hinges 15 and 16, both towards the shore 3 and towards the water.

The deck unit is formed from several individual units 36 disposed in series, one of which is represented in FIGURE 13. The units are formed from two structural members or rails 17 (only one of which is visible in the figure). The structural members 17 are supported by a trestle 19 and are joined in spaced apart relation by means of ties (not visible in the figure). The rollers 20 are mounted between the rails 17.

The cable portion raised on board is disposed on the swinging sector 8 and is supported on the deck units as far as the hold from which it was taken up. Said cable portion enters the hold over the orientable sector 21 (represented in detail in FIGURE 12) and the hatch sector 22 (represented in detail in FIGURE 11).

Figure 11:
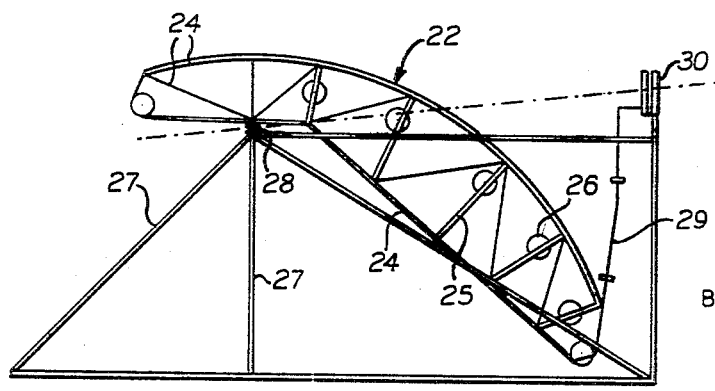

Referring to FIGURE 11, the hatch sector 22 is formed from two planar frames 24 of curved form or profile (only one of which is visible in the figure) joined in spaced apart relation by U-shaped ties or member 25. The members 25 carry the rollers 26 disposed along a curved path having a radius greater than the minimum permissible bending radius of the cable.

The hatch sector 22 is mounted on an appropriate trestle 27, which is disposed over the opening of the hold in such a way that the rollers of the sector have their axes parallel to that of the vessel. The sector is supported on the trestle 27, at one of its ends, by means of a hinge 28 having its axis of rotation in a transverse direction with respect to the axis of the vessel. At the other end the sector is supported by means of a tie rod 29 connected at one end to the sector and at the other end of the trestle by means of a hinge 30, having an axis parallel to that of the hinge 28 and aligned with it. In this way the end of the sector connected to the tie rod 29 is positioned within the opening of the hold, and rotation of the sector 22 about the axis of the hinges 28 and 30 permits it to follow the cable as it is unwound from the reel back and forth along the reel.

The cable guided by the hatch sector 22 emerges from the hold at right angles to the longitudinal axis of the vessel. Thereupon the orientable sector 21 (see FIGURE 12) guides the cable either to the chute 5, during the operation of laying through the water, or to the deck units, during the landing of the shore ends. It is formed from two planar frames 32 (only one of which is visible in the figure) in the form of circular segments, which are joined in spaced apart relation by means of a plurality of transverse members or ties. The curved portion 33 of said frames has a curvature chosen so as not to permit bending of the cable in excess of the maximum permissible. The portions 33 are in the shape of rails and support the driving rollers 34 therebetween.

The frames 32 are also provided, in their rectilinear portion, with a hinge 35 disposed at one end of the sector. Hinge 35 enables sector 21 to be pivotally joined to the supporting trestle 27 of the hatch sector, in series therewith. As so pivoted it can be shifted between two positions, namely with the axes of the rollers horizontal and parallel to the axis of the vessel to guide the cable to the laying chute and with the axes of the rollers vertical to guide the cable to the deck units.

Figure 5:
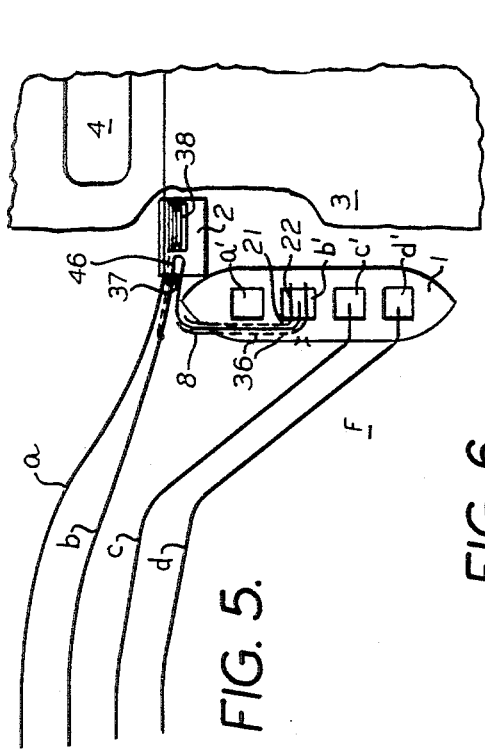
FIGURES 5 and 6 illustrate the steps subsequent to that of the FIGURES 3 and 4, in which the cable is dragged ashore.
Figure 6:
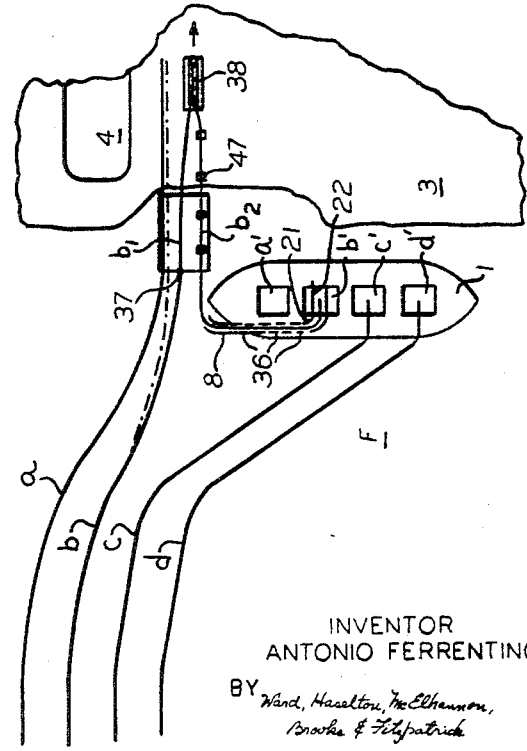

FIGURES 5 and 6 illustrate the operations for landing the cable $b$ after it has been raised and disposed on board the vessel. The cable $b$ emerges from the hold $b'$ on the hatch sector 22 and is guided and supported by the orientable sector 21 and by the deck units 36 as far as the swinging sector 8, whose curved portion is directed towards the shore. The cable portion coming from the water direction is secured at 37 to the platform 2 which carries a wheeled vehicle, provided with a pulley, diagrammatically indicated by the numeral 38.

The vehicle is illustrated in detail in FIGURE 9. It is formed from a metallic frame 40 provided with a pair of steerable front wheels 41. The other pair of wheels 41' oscillate vertically to absorb the irregularities of the ground.

In the embodiment shown in FIGURE 9, each wheel 41' is supported at the end of a bell crank member 42, the vertical arm of which is connected to the corresponding arm of the other wheel by means of a cable 39 which passes along the perimeter of the frame to avoid interference with the cable when placed on the pulley. Upstanding from said frame 40 are two supports 43 (only one of which is visible in the figure) on which the pulley 45 is mounted by means of a shaft 44. The shaft 44 is pivoted by means of a ball joint in one of the supports. The other support can be lowered by acting on a suitable mechanism. In this way the pulley 45 can be supported in cantilever fashion by only one of the supports 43 and the cable can be inserted in its groove.

Referring again to FIGURES 5 and 6, 46 indicates a loop or bight formed in the cable in the portion between the swinging sector 8 and the point 37. As indicated above, the loop 46 is inserted by hand in the groove of the pulley 45. The support 43, previously lowered, is returned to its position supporting shaft 44. The vehicle is now pulled ashore and driven along one side of the trench 4. In this way it is possible to obtain a bight which consists of a branch $b_1$ (the portion of cable which is laid on the ground as a continuation of the one crossing the water) and a branch $b_2$ (the cable portion which is paid out from the reel and travels from the swinging sector 8 to the pulley 45, entering the groove of the latter at the top).

The branch $b_2$ of the cable is in continuous motion in consequence of the forward motion of the vehicle 38. In order to prevent damage to the cable due to its movement relative to the ground, it is supported at intervals by suitable rollers 47. The vehicle 38 continues its travel alongside the trench 4 until the cable is completely paid out from the reel and thereafter the whole branch $b_2$ of the bight is unwound.

When the operations carried out for the cable $b$ are over, they are analogously repeated for cables $c$ and $d$, so as to obtain a group of four cables completely laid down at the side of the trench. Now the vessel can leave the shore without any further operation, and the platform 2 can be removed, the cable portion previously supported by said platform being allowed to float, for instance by fastening it to hollow barrels. By doing this, it is possible to apply to this cable portion appropriate mechanical protecting elements, to facilitate the final laying of the cable in the trench 4 and to eliminate, by means of a suitable driving action, the deviations previously imparted to the submerged cable.

The foregoing description explains a particular execution and certain embodiments of the invention; it is, however, to be understood that numerous changes may be made therein as will be apparent to those skilled in the art without departing from the true spirit of the invention as defined in the appended claims. For instance, if the vessel, on account of its draft, cannot approach close to the platform 2, provision can be made of a second platform containing the vehicle 38, which is brought in proximity to the side of the vessel. In said case, the operations are carried out as previously described, considering this second platform as the above mentioned platform 2. After having inserted the cable in the groove of the pulley, the second platform is brought to platform 2 and the vehicle is dragged ashore; then the necessary operations are repeated as described above.

According to a further embodiment, the landing point, namely the platform 2, can be aligned with the trench 4. In this case the cables can be laid directly in the trench, by causing the vehicle 38 to run within it, assuming there is sufficient room, as is generally the case when several cables are to be simultaneously laid.

The direct laying of the cable in the trench can alternatively be obtained, in all the above cases, by making use of a vehicle of different type, as for instance the one illustrated in FIGURES 14 and 15. Said vehicle, indicated with 48 in the figures, has a pulley 49 whose axis of rotation is vertical, as shown. The frame supporting the pulley, provided with two front and two rear wheels, at least one pair of wheels being orientable, is also provided with two guides 50 provided with rollers, one for laying the cable and the other for leading it into the groove of the pulley.

The vehicle is caused to travel along the side of the trench 4 in such a way that the cable leaving the pulley, namely the branch $b_1$, is guided and laid directly into it. The other branch $b_2$ of the bight is caused to run on rollers, analogously to what was described above. A vehicle of this kind, besides allowing the direct laying of the cable in any type of trench, even of small width, has the advantage not to require particular maneuvers and devices for enabling the loop of the cable to be placed in the groove of the pulley.

What is claimed is:

1. A method for bringing ashore the land ends of a plurality of submarine electric cables which have been laid simultaneously through a body of water by paying them out over the side of a vessel through individual chutes and from respective supply reels in the holds thereof, comprising the steps of maneuvering the vessel as it nears the shore off to one side of the desired cable path and bringing one end of the vessel opposite a landing point off to the same side of the desired path with the remainder of the vessel farther down the desired path, removing one of the cables from its chute and laying it along the deck of the vessel from its reel to said one end of the vessel by both raising a portion of the cable adjacent the vessel and withdrawing cable from the reel, continuing to draw cable from the reel paying it out over said end of the vessel to form a bight, drawing the bight ashore and toward a desired terminus all the while withdrawing cable from the reel until the remaining cable is laid ashore, and repeating the operation for each of the other cables.

2. A method according to claim 1, wherein the step of maneuvering the vessel comprises first leaving the desired cable path and heading the vessel toward said landing point, and then further altering the course of the vessel to bring said end opposite the landing point, said landing point being substantially in line with the main underwater section of the cable which is furthest removed from the desired cable path on either side thereof.

3. A method according to claim 2, wherein the step of removing the cable from the chute and laying it along the deck comprises providing a first rope member between said end of the vessel and a submerged point of the cable where the rope member is attached to the cable, providing a second rope member between the vessel and a point on the cable nearer to the vessel than the first point where the second rope member is attached to the cable, and manually manipulating the two rope members to lift the cable from the chute and lay it along the deck.

4. A method according to claim 1, wherein as the bight is drawn ashore that portion betwen the vessel and the shore which is intended to be submerged is temporarily supported above the water by flotation means.

5. A method according to claim 4, wherein the portion of the cable supported by flotation means is provided with protective covering material while so supported.

6. A method according to claim 1, wherein the bight of the cable is looped around a pulley located adjacent said end of the vessel and drawn ashore by moving said pulley to said terminus.

7. A method according to claim 6, wherein the radius of said pulley is selected at least as large as the minimum bending radius of said cable.

8. A method according to claim 1, wherein the cable is guided from its reel in the hold of the vessel to and off said end of the vessel by a tandem arrangement of hatch sector, orientable sector, deck units, and swinging sector, all of which are provided with rollers for supporting the cable and limiting the bending thereof.

9. A method according to claim 1, wherein the cable is conducted from its reel in the hold of the vessel to and off said end of the vessel over bend limiting means wherever the cable is required to bend in traveling between the two points, the bend limiting means being selected to prevent the cable from bending beyond its minimum bending radius.

10. Apparatus for bringing ashore the land ends of a plurality of submarine electric cables comprising a vessel having holds for receiving reels of cable; a hatch in the deck of the vessel for each reel; supported above each hatch a hatch sector and an orientable sector, each provided with rollers, for guiding the cable as it leaves the reel and directing it as it leaves the hatch, respectively; a plurality of trestle supported horizontal deck units provided with rollers for supporting and guiding the cable from the orientable sector to an end of the vessel; a swinging sector provided with rollers and mounted at said end of the vessel for guiding the cable overboard in any direction throughout an arc of 160° centered about a point at said end of the vessel; a floating platform: a wheeled vehicle capable of being supported on said platform and of being moved ashore therefrom, a pulley carried by said vehicle; and means for towing said platform from said vessel to an adjacent shore and for moving said vehicle from said platform to the shore.

11. Apparatus according to claim 10, wherein said hatch sector comprises a pair of planar frames of curved profile joined in spaced apart relation by a plurality of U-shaped members, its rollers being mounted in said members along a curved path established in accordance with the permissible bending radius of the cable, said hatch sector being hinged at both its ends to a supporting trestle, directly at its upper end and through a tie rod at its lower end; said orientable sector comprises a pair of planar frames in the shape of circular segments joined in spaced apart relation by a plurality of transverse members, the curved portion of each of said segments being formed from an arcuate beam to which the rollers of the orientable sector are secured; said deck units each comprising a pair of rails to which its rollers are secured; said swinging sector comprises a pair of planar frames having a straight portion and a curved portion, said last mentioned frames being joined in spaced apart relation by a plurality of U-shaped members to which its rollers are secured, said last mentioned rollers being disposed along a straight line in the straight portion of the frames and along a curved path in the curved portion of the frames, the curved path being established in accordance with said minimum bending radius of the cable, said swinging sector being hinged in a supporting trestle at two points for pivotal movement about a rectilinear axis passing through said two points; and said orientable sector is disposed in series with said hatch sector such that its rollers can be positioned horizontally for guiding cable to the side of the vessel or vertically for guiding cable to a deck unit.

12. Apparatus according to claim 10, wherein said wheeled vehicle supports said pulley on a horizontal shaft, and a support for one end of said shaft is removable for threading a cable around the pulley.

13. Apparatus according to claim 10, wherein said wheeled vehicle carries said pulley on a vertical shaft which is supported at its lower end by the vehicle, and guides are mounted on the vehicle adjacent the periphery of the pulley on opposite sides thereof for guiding the cable on and off the pulley on opposite sides of the vehicle.

References Cited
UNITED STATES PATENTS
1,603,106 10/1926 Ferry et al. _____ 61—72.3
2,476,953 7/1949 Bennett _____ 61—72.1

FOREIGN PATENTS
1,023,398 3/1966 Great Britain.

OTHER REFERENCES
1,207,465, December 1965, German Printed Application to Zenger.

JACOB SHAPIRO, Primary Examiner

U.S. Cl. X.R.

61—72.3, 72.5; 214—1, 12